(12) United States Patent
Enguidanos Castillo

(10) Patent No.: US 11,273,577 B2
(45) Date of Patent: Mar. 15, 2022

(54) METHOD FOR REMOVING MOISTURE FROM POLYMER PELLETS FOR PLASTIC INJECTION AND EXTRUSION

(71) Applicant: Xilex Development, s.l., Paterna (ES)

(72) Inventor: Amparo Enguidanos Castillo, Paterna (ES)

(73) Assignee: Xilex Development, s.l., Paterna (ES)

( * ) Notice: Subject to any disclaimer, the term of this patent is extended or adjusted under 35 U.S.C. 154(b) by 404 days.

(21) Appl. No.: 16/491,134

(22) PCT Filed: Feb. 28, 2018

(86) PCT No.: PCT/ES2018/070146
§ 371 (c)(1),
(2) Date: Sep. 4, 2019

(87) PCT Pub. No.: WO2018/158481
PCT Pub. Date: Sep. 7, 2018

(65) Prior Publication Data
US 2021/0316482 A1    Oct. 14, 2021

(30) Foreign Application Priority Data

Feb. 28, 2017   (ES) ................. ES201730269

(51) Int. Cl.
*B29B 13/00* (2006.01)
*B29B 13/06* (2006.01)
*B29B 13/02* (2006.01)
*B29B 13/08* (2006.01)

(52) U.S. Cl.
CPC .......... *B29B 13/065* (2013.01); *B29B 13/02* (2013.01); *B29B 13/08* (2013.01)

(58) Field of Classification Search
CPC ......... B29B 13/00; B29B 13/02; B29B 13/06; B29B 13/065; B29B 13/08
See application file for complete search history.

(56) References Cited

U.S. PATENT DOCUMENTS 2,474,952 A * 7/1949 Miskella ................ F26B 17/26
34/60
10,500,764 B2 * 12/2019 Polato ........................ B01J 8/12

FOREIGN PATENT DOCUMENTS

GB           631790 A * 11/1949 .............. F26B 17/26

* cited by examiner

*Primary Examiner* — Jacob T Minskey
*Assistant Examiner* — Matthew Hoover
(74) *Attorney, Agent, or Firm* — Nancy J. Flint, Attorney At Law, P.A.; Nancy J. Flint, Esq.

(57) ABSTRACT

The invention relates to a solution for reducing and removing moisture from plastic pellets by means of absorption and condensation, in which energy consumption is reduced and the process is simplified, making use of infrared wavelength efficiency, and comprising the following steps: 1. a supply phase using a dosing tank; 2. a distribution phase using a pellet levelling and dispensing device, a conveyor belt and a vibrating motor on the conveyor belt; 3. a moisture-removal phase using one or more infrared wave emitters disposed in parallel, a ventilated or cooled motor for a set of emitters, an air-recirculation passage for a set of emitters, an input temperature probe, an output temperature probe, and a moisture control probe; and 4. a discharge phase in which the material from which the moisture has been removed is discharged using a thermally-insulated collector tank.

7 Claims, No Drawings

METHOD FOR REMOVING MOISTURE FROM POLYMER PELLETS FOR PLASTIC INJECTION AND EXTRUSION

SECTOR OF THE TECHNIQUE

The method for removing moisture from polymer pellets for plastic injection and extrusion is used in processes of manufacturing plastic parts from new or recycled polymer pellets of all kinds of resin (PP, PE, PA, PMMA, PC, PET, etc. . . . ), being the object of this invention.

PREVIOUS TECHNIQUE

The many, varied types of resin used every day in the modern plastics industry require in-depth understanding of the different drying technologies for removing moisture from plastic pellets to exactly the required level.

Polymers are divided into hygroscopic (water absorbing) and non-hygroscopic according to their general water absorption characteristics.

To achieve high product quality and, consequently, reduce rejects, improve productivity and control production costs tightly, it is essential that processors have the option of being able to work on the material on-line without that representing an extra stage in the process.

Existing technologies are all based on the use of "dry air" and, although they solve the problem of drying the pellets, work discontinuously or in blocks and so limit the production process in injection or extrusion, with complex systems in transfer of the material.

These technologies work in periods of hours (2-6 h), in contrast to the minutes and/or seconds required by the processes in the invention.

These are the drying systems used:

Internal, Hygroscopic Drying:

Vacuum drying. This is appropriate for drying heat-sensitive materials which can crystallise. The great advantage of this type of dryer is that they have a very short cycle compared with other available options. They work in batches, so if the main criterion is increasing productivity based on batches, not continuously. They require high initial investment, and the vacuum seals are liable to contamination by dust particles.

Energy consumption per 1 kg of PC—61 W–h/Kg and estimated drying time—1 hour

Infrared dryers. This, relatively new, technology only differs from hot-air drying—described below—in the heat generation method. Infrared dryers use energy efficiently, have low dust levels and require a short length of residence. Infrared drying crystallises PET. The surface of the bulk material heats quickly, but it is not easy to maintain temperature control through all the material. Infrared dryers have proven to be very effective in non-plastic materials like coffee and wood. However, the technology is not well tried and tested in our industry and this kind of dryer still represents a large investment, as well as requiring intensive maintenance.

Energy consumption per 1 kg of PC—unknown and estimated drying time—3 hours

Surface Dryers:

Hot-air dryers. Hot-air drying for removing surface moisture from pellets is tried and tested in the industry. Although not suitable for hygroscopic applications, hot-air dryers are occasionally used for slightly hygroscopic materials in drying processes not susceptible to that effect. They also help to preheat material in order to increase efficiency and quality of production processes.

Energy consumption per 1 kg of PC—58 W–h/Kg and estimated drying time—4 hours

Desiccant dryers. These dryers are suitable for all materials, so that the equipment can remain in operation even if the production programme is changed. There are various types of unit, from centralised systems to mobile units for installation next to the press. Desiccant dryers use air in a closed cycle sent towards the dehumidifier and over the material in the drying chamber.

Energy consumption per 1 kg of PC—64 W–h/Kg and estimated drying time—2.5 hours

Compressed air dryers. These dryers take compressed air from the plant's supply line and expand it to atmospheric pressure. This produces process air with a very low dew point which is then heated to the required ambient temperature. It does not require desiccant. Modern units include all the safety features to be expected, including a thermostat and low-airflow switch, to prevent the material overheating. But, and this is important, compressed air is the most expensive supply in any factory. So, unless the flow of material to be dried is low, it is not a cost-effective option.

Energy consumption per 1 kg of PC—261 W–h/Kg and estimated drying time—3 hours.

Technical Problem

In the process of moisture reduction and elimination in plastic pellets, various problems arise which this patent's innovation allows us to deal with.

Centralised installations are characteristically complex, large tanks for up to 6 hours of autonomous drying being required to be able to guarantee stability of plant production. This entails having to use, on one hand, silo heating systems to keep the temperature as stable as possible and, on the other hand, at the same time using air dryers to recirculate dry air to the silos to dry the pellets. This process can last 3-6 hours with all the problems involved of material movement and complexity of production organisation.

In individual installations, while material movement is less, the problem of drying time is the same as in centralised systems, synchronisation of injection or extrusion being a time organisation problem.

In both cases, depending on the hygroscopy of the pellets, moisture absorption and condensation problems may appear which damage production, with defects called splay or silver streaks appearing in the injected parts. In some materials, hydrolysis may appear, affecting their mechanical characteristics. These problems are usually dealt with by installing preheated tanks in the mouth of the injection/extrusion machine to keep the process stable and even mounting several devices in series to provide more drying time, but they are difficult to solve.

Another problem is that, because of the friction of the hot, dry air in the silos and pellet transfer ducts, static electricity appears in materials, producing many problems with polarities and the consequent flaws.

Pellet moisture suppression processes are based on wet to dry air treatment and providing temperature for hours (3-6 hours), with complicated systems of tanks, air dryers, temperature heaters, duct systems for moving material, a large volume of pellets being moved to ensure production.

Technical Solution

The behaviour of these materials depends intrinsically on their water absorption which will be faster or slower depending on their hygroscopy, but when radiation is used, depending on the wavelength, effects are added which must be taken into account because of the molecular vibration the wavelength causes. The wrong wavelength can damage the material (stress) and, just as water is absorbed by the material, it must escape from inside it without damaging the polymer.

From a study and tests carried out on polymers, a technical solution has been obtained which enables reduction and elimination of moisture with the consequent advantages, through a drying system which, in addition to removing moisture, tempers and heats the polymer pellets to be used in injection and extrusion and blowing, with no need for complex systems or excessive movement of materials, so greatly simplifying processing and turning hours into a few minutes.

From the tests carried out, it has been determined that hygroscopic and non-hygroscopic materials have the ability to absorb and/or expel moisture, but with the effects of radiation have different behaviour for which we subdivide them into:

Hygroscopic materials: These are polar materials, so have the ability to attract water and also radiation. However, polymers of PPE and HIPS mixtures are only slightly polar, so the proportion of moisture depends on the chemical composition of the polymer and its polarity absorbing 0.07% of moisture. ABS, SAN, ACRYLIC, PPE/HIPS, PPS, POM, PVC are considered hygroscopic materials. They are materials to be dried by about 0.05%-0.1% and tend to present superficial aesthetic problems.

But polymers such as nylon exist which are highly polar and have a water saturation point of 8-9% of moisture, which they absorb 100 times more than than hygroscopic compounds like PPE and HIPS. These compounds, nylon, PET polyester, polycarbonate (PC), PBT polyester, PLA, PEI, and PAI, are classified as highly hygroscopic. They are materials to be dried below 0.02% and present structural problems (hydrolysis occurs, damaging their structure).

Non-hygroscopic materials: these are "non-polar" materials, so do not attract water. The material of polyolefin-type polymers such as polyethylene and polypropylene does not need to have moisture removed, but does need to be heated. They are materials which absorb water to the order of 0.01% moisture on their surface. Materials like PE, PP, polyester, styrene-butadiene copolymer, and polymethylpentene, are non-hygroscopic materials.

But, depending on the polymer's behaviour, a hydrophobic material may appear with the wavelength (radiation). These materials do not absorb water and are not polar, so, with regard to radiation, we call them amorphous. These materials are only heated for the specific application, but moisture is not removed from them.

This invention is based on the effect caused by different specific wavelengths in the visible and invisible infrared spectrum with ranges (in micrometres) of 0.9 to 3.2 μm, which produce a specific molecular vibration of water so that both internal and superficial evaporation are optimised, according to the density of the pellet materials.

In a body, this radiation is propagated as a result of two phenomena: absorption being converted into heat (the greater the wavelength, the greater the absorption), and penetration being greater the shorter the wavelength is.

We call the use of different TYPES of wavelength to obtain better drying efficiency in accordance with polymers' hygroscopic characteristics "wavelength efficiency."

For better wavelength efficiency, the following types are considered:

TYPE 1: Wavelength of 2-3.2 μm for materials considered highly hygroscopic.
TYPE 2: Wavelength of 1.6-2.0 μm for hygroscopic materials.
TYPE 3: Wavelength of 1.4-1.6 μm for non-hygroscopic materials.
TYPE 4: Wavelength of 0.9-1.4 μm for amorphous materials.

Advantageous Effects

This invention has two big advantages, one functional and the other environmental. The former, for functional purposes, with use of drying for optimum conditioning or pretreatment of plastic pellets to eliminate traces of moisture which might cause flaws or alterations in the shaping process—injection, extrusion and blowing—of parts.

In functional and operational terms:
No preparation time is used—it is a just-in-time production system
Space is not occupied unnecessarily
There is no movement of material for treatment, so there is process simplification
Repeatability and operating parameters are guaranteed
Both superficial and internal dehydration and tempering are enabled.
Production can be planned without having to depend on moisture removal.
Individual or central dehumidification systems can be used according to requirements.
Easy to implement in both new and working facilities.
And the second advantage lies in the reduction of energy and electric power consumed by known, conventional pretreatment systems.
Energy consumption is minimal. SAVINGS up to 95% in dehydration and tempering processes (the system only consumes when activated).
Savings of 15-20% in injector consumption are estimated because material is introduced in them at higher temperature.

Hygroscopic tests give the comparative results and drying times shown in Table 1:

TABLE 1

Comparison of drying systems

| SYSTEM | ENERGY CONSUMPTION (W/hKg) | DEW POINT | DRYING TIME (h) |
|---|---|---|---|
| Hot-air dryers | 58 | ambient | 4 |
| Hot-air dryers with energy recovery | 47 | ambient | 4 |
| Compressed-air dryers | 261 | −20° C. | 3 |
| Vacuum dryers | 61 | −40° C. | 1 |
| Infrared dryers | | ambient | 3 |
| Desiccant dryers | 64 | −40° C. | 2.5 |
| Dryers of this invention | 10 | ambient | 0.03 (2 min.) |

According to the comparison in Table 1, this technology gives energy consumption values of the order of 10 W/hKg with drying times of 0.03 hours (2 min.) compared with the range of 61-261 W/hKg and 1-4 hours of conventional systems.

HOW THE INVENTION IS CARRIED OUT

The method for removing moisture from polymer pellets for plastic injection and extrusion is based on the infrared spectrum wavelength efficiency of the materials to be treated, which are of four types:

TYPE 1: Wavelength of 2-3.2 μm for materials considered highly hygroscopic

TYPE 2: Wavelength of 1.6-2.0 μm for hygroscopic materials

TYPE 3: Wavelength of 1.4-1.6 μm for non-hygroscopic materials.

TYPE 4: Wavelength of 0.9-1.4 μm for amorphous materials

These types are distributed in one or more wavelength emitters in parallel and combined in a set or not, depending on the hygroscopy of the product to be treated, by a procedure in successive phases with the provision of the following technical resources:

1. —A dosing tank, with or without a stirrer and with or without thermal insulation
2. —A pellet levelling and dispensing device
3. —One or more infrared wave emitters disposed in parallel arranged wavelength of greatest efficiency (Type 1 to Type 4)
4. —A ventilated or cooled motor for a set of emitters
5. —An air recirculation passage for a set of emitters
6. —An input temperature probe
7. —An output temperature probe
8. —A moisture control probe
9. —A conveyor belt
10. —A vibrating motor on the material conveyor belt
11. —A thermally insulated collector tank A 1st supply phase is carried out with a dosing tank, with or without stirrer and with or without thermal insulation (1); A $2^{nd}$ distribution phase takes place through a pellet levelling and dispensing device (2), a conveyor belt (9) and a vibrating motor on the material conveyor belt (10); A $3^{rd}$ moisture removal phase is carried out by one or more infrared wave emitters in parallel (3), a ventilated or cooled motor for a set of emitters (4), an air recirculation passage for a set of emitters (5), an input temperature probe (6), an output temperature probe (7) and a moisture control probe (8); and finally, a 4th phase of discharge of the material from which the moisture has been removed to a thermally insulated collector tank.

With regard to the type of relationship between the efficiency of wavelength and the materials to be treated explained above, it can be deduced that the following wavelengths in one or more infrared wave emitters should be used, according to the private tests carried out: A wavelength of 2-3.2 μm for materials considered highly hygroscopic (TYPE 1); a wavelength of 1.6-2.0 μm for hygroscopic materials (TYPE 2); a wavelength of 1.4-1.6 μm for non-hygroscopic materials (TYPE 3); and a wavelength of 0.9-1.4 μm for amorphous materials (TYPE 4).

Optionally, an ancillary suction pump may be used in the dosing tank, and a cleaning brush system may be used on the conveyor belt.

The invention claimed is:

1. A method for removing moisture from polymer pellets for plastic injection and extrusion characterised in that it comprises a 1st supply phase using a dosing tank, with or without stirrer, and with or without thermal insulation; a 2nd distribution phase using a pellet levelling and dispensing device, a conveyor belt and a conveyor belt and a vibrating motor on the conveyor belt; A 3rd moisture-removal phase using one or more infrared wave emitters disposed in parallel, a ventilated or cooled motor for a set of emitters, an air-recirculation passage for a set of emitters, an input temperature probe, an output temperature probe, and a moisture control probe; and finally, a discharge phase in which the material from which the moisture has been removed is discharged using a thermally-insulated collector tank.

2. Procedure for moisture removal from polymer pellets for plastic injection and extrusion for materials considered highly hygroscopic in accordance with claim 1, characterised in that it comprises one or more emissions of infrared waves with a wavelength of 2-3.2 μm.

3. A procedure for moisture removal from polymer pellets for plastic injection and extrusion for materials considered hygroscopic in accordance with claim 1 characterised in that it comprises one or more emissions of infrared waves with a wavelength of 1.6-2.0 μm.

4. A procedure for moisture removal from polymer pellets for plastic injection and extrusion for materials considered hygroscopic in accordance with claim 1 characterised in that it comprises one or more emissions of infrared waves with a wavelength of 1.4-1.6 μm.

5. A procedure for moisture removal from polymer pellets for plastic injection and extrusion for materials considered hygroscopic in accordance with claim 1 characterised in that it comprises one or more emissions of infrared waves with a wavelength of 0.9-1.4 μm.

6. A procedure for moisture removal from polymer pellets for plastic injection and extrusion in accordance with claim 1 characterised in that an ancillary suction pump can be used in the dosing tank.

7. A procedure for moisture removal from polymer pellets for plastic injection and extrusion in accordance with claim 1 characterised in that a cleaning brush system can be used on the conveyor belt.

* * * * *